(12) United States Patent
Hiraoka et al.

(10) Patent No.: US 6,444,887 B1
(45) Date of Patent: Sep. 3, 2002

(54) STRING-PLUCKING TYPE ELECTRONIC MUSICAL INSTRUMENT WITH PHOTO SENSOR FOR GENERATING SIGNAL FOR SOUND

(75) Inventors: Tadashi Hiraoka; Isamu Kubota, both of Tokyo (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/831,728

(22) PCT Filed: Sep. 13, 2000

(86) PCT No.: PCT/JP00/06281

§ 371 (c)(1),
(2), (4) Date: May 15, 2001

(30) Foreign Application Priority Data

Sep. 16, 1999 (JP) .............................. 11-261825

(51) Int. Cl.$^7$ .......................... A63J 17/00; G09B 15/04
(52) U.S. Cl. ....................... 84/600; 84/464 A; 84/477 R
(58) Field of Search .......................... 84/724, 600, 646, 84/722, 464 R, 464 A, 477 R, 478, DIG. 30

(56) References Cited

U.S. PATENT DOCUMENTS 4,442,750 A * 4/1984 Bowley ........................ 84/724
5,909,028 A * 6/1999 Yamamoto ................ 84/724 X

FOREIGN PATENT DOCUMENTS

| FR | 2578079 | * 8/1986 | .................. 84/724 |
| JP | 62-104300 | 7/1987 | |
| JP | 63-118094 | 7/1988 | |
| JP | 11-242483 | 9/1999 | |

* cited by examiner

Primary Examiner—Stanley J. Witkowski
(74) Attorney, Agent, or Firm—Kanesaka & Takeuchi

(57) ABSTRACT

An electronic musical instrument of the string-plucking type which does not create a large time lag from when the musical instrument is operated until when the sound is produced, and does not cause a detection mechanism to become complex. A photo sensor (11) for being operated by a player is provided in a main body (10) that is formed in a shape resembling a string-plucking musical instrument. The photo sensor (11) generates a signal for producing sound when the light emitted from a light-emitting unit (11a) to a light-receiving unit (11b) is not detected by the light-receiving unit (11b). A detection signal from the photo sensor (11) needs not be put to the conversion processing, and the time can be shortened from when the musical instrument is operated until when the sound is produced. Since light is used, the constitution of the detection mechanism does not become complex.

9 Claims, 7 Drawing Sheets

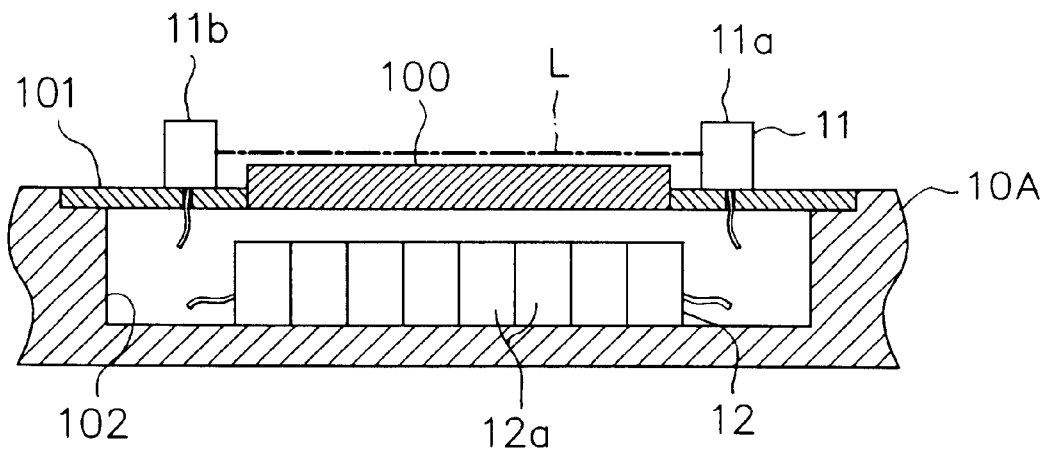
Fig. 3
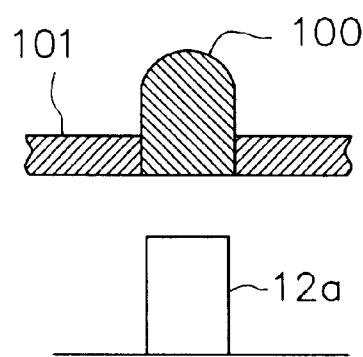 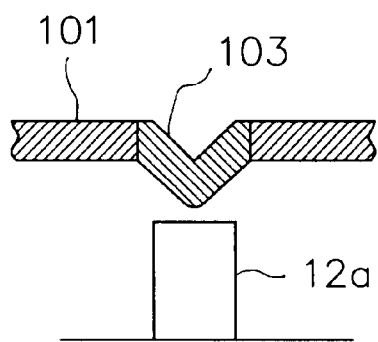
Fig. 4(a)         Fig. 4(b)

US 6,444,887 B1

STRING-PLUCKING TYPE ELECTRONIC MUSICAL INSTRUMENT WITH PHOTO SENSOR FOR GENERATING SIGNAL FOR SOUND

TECHNICAL FIELD

The present invention relates to an electronic musical instrument of the string-plucking type in which the sound is produced based upon signals from an operation unit operated by a player.

BACKGROUND ART

An electric guitar which uses mechanical vibration upon plucking the strings as a sound source has been widely known. On the other hand, some musical instruments imitating a string-plucking musical instrument such as a guitar have been proposed already among electronic musical instruments in which a sound source for electronically producing and amplifying sound is given separately.

In the electronic musical instrument of the string-plucking type, the portions played by fingers are formed by strings (hereinafter referred to as string-like members) similar to the real ones, and the vibrations of the string-like members are detected by detection means to produce sound.

In the above electronic musical instrument of the string-plucking type, however, after the vibrations of the string-like members are detected by the detection means, the analog wave signals from the detection means must be converted into digital signals at a moment when the waveforms are stabilized in order to produce sound from a sound source on the computer side. Therefore, a delay time occurs due to the conversion of signals, a time lag increases from when the musical instrument is operated until when the sound is produced, and a player feels it unnatural to play. In the electronic musical instrument of the string-plucking type, further, a signal converter is necessary on the side of the detection mechanism causing the detection mechanism to become complex, requiring cumbersome adjustment, and permitting fault to easily occur.

In view of the above-mentioned points, it is an object of the present invention to provide an electronic musical instrument of the string-plucking type which does not develop much time lag from when the musical instrument is operated until when the sound is produced, and does not cause the detection mechanism to become complex.

DISCLOSURE OF THE INVENTION

A first invention comprises:

a main body formed in a shape resembling a string-plucking musical instrument; and a photo sensor provided in the main body for being operated by a player and generating a signal for producing sound when light emitted from a light-emitting unit toward a light-receiving unit is not detected by the light-receiving unit.

In this invention, when the player interrupts the light emitted from the light-emitting unit of a photo sensor by using a finger or a tool, the light-receiving unit of the photo sensor detects the interruption and sends a signal to the sound source side to produce sound. Therefore, there is no need of converting analog signals into digital signals for producing sound, and the time can be shortened from when the musical instrument is operated (playing operation) until the sound is produced. Further, in this invention, the photo sensor having the light-emitting unit and the light-receiving unit works as the detection mechanism enabling the detection mechanism to be simply constituted.

A second invention is concerned with the first invention, wherein a path of light emitted from the light-emitting unit is provided near a position where strings are arranged over the main body in the case of the string-plucking musical instrument.

In this invention, the path of light is located near the strings of the string-plucking musical instrument, and the player can operate the musical instrument (playing operation) in a manner as if he operates the strings of the string-plucking musical instrument, and the player feels little unnatural to play the electronic musical instrument.

A third invention is concerned with the first or the second invention, wherein the photo sensor is a photo interrupter or detector using infrared rays.

A fourth invention is concerned with any one of the first, second or third invention, wherein an indication device is provided at a position along the path of light of the photo sensor to indicate the position of operation to the player.

In the invention, the player learns the path of light emitted from the light-emitting unit owing to the indication device, operates the musical instrument with the indication device as a mark, and is allowed to easily play the musical instrument.

A fifth invention is concerned with the fourth invention, further comprising a light-emitting device to indicate whether the light-receiving unit has detected light or not by emitting light and not emitting light, and wherein the indication device is formed of a light-transmitting material that permits the transmission of light from the light-emitting device.

In the invention, light is emitted from the light-emitting device to illuminate the indication device so that the indication device brightly shines due to light and the position of the indication device is clearly shown. Further, no light is emitted from the light-emitting means so that the indication device becomes dark and, for example, it is shown to the player that the light-receiving unit has detected the behavior of operating the musical instrument (playing operation). The light-emitting device may emit light when the light-receiving unit has detected the playing operation of the player, as a matter of course.

A sixth invention is concerned with the fourth invention, further comprising a light-emitting device to indicate whether the light-receiving unit has detected light or not by changing the color of the emitted light, and wherein the indication device is formed of a light-transmitting material that permits the transmission of light from the light-emitting device.

In the invention, the color of light emitted from the light-emitting device differs according to whether the light-receiving unit has detected the playing operation or not, thereby clearly showing to the player the position of the indication device and indicating that the light receiving unit has detected the playing operation by the player.

A seventh invention is concerned with any one of the first to sixth inventions, wherein a touch-sensing protuberance or dent is formed at a position along the path of light of the photo sensor to give operation feeling to the player.

In these inventions, when, for example, the player moves his finger so as to interrupt the light from the light-emitting unit, the finger comes to touch the protuberance or the dent and the player feels as if he has plucked the string with his finger. The similar feeling can be obtained even by using a tool (pick or the like). In the case of the second invention, the protuberance can be perceived by the player like a string. In the invention, the protuberance may be arranged to be in agreement with the indication device so as to let itself shine by light of the light-emitting device.

An eighth invention is concerned with any one of the first, second, third, or seventh invention, wherein a vibration-generation device is provided at a position where the body of the player comes to touch therewith to indicate whether the light-receiving unit has detected light or not.

In these inventions, when, for example, the light-receiving unit has detected the playing operation of the player, the vibration-generating device is actuated so that the player may feel with his body that the musical instrument has been played well. Alternatively, the vibration-generating device may be normally actuated, and the operation of the vibration-generating device may be halted when the light-receiving unit has detected the playing operation of the player.

BRIEF DESCRIPTION OF DRAWINGS

FIG. 3 is a sectional view around a photo interrupter of the electronic guitar;

FIG. 4(a) is a sectional view around a protuberance over an LED;

FIG. 4(b) is a sectional view around a dent over the LED;

BEST MODE FOR CARRYING OUT THE INVENTION

Preferred embodiments of the invention will now be described with reference to the drawings.

Figure 1:
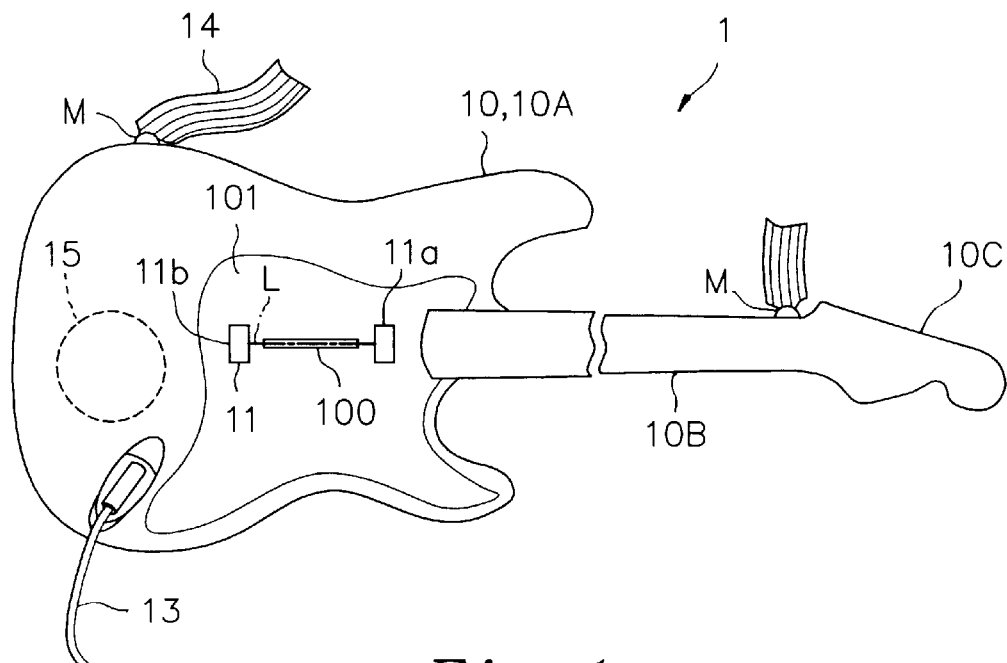
FIG. 1 is a top view of an electronic guitar according to a preferred embodiment of the present invention.

FIG. 1 illustrates an electronic guitar according to an embodiment of the present invention.

The electronic guitar 1 is an electronic musical instrument of the string-plucking type that has a sound source provided separately and is constituted, as shown in FIG. 1, by a main body 10, a photo interrupter 11 which is a photo sensor, a light-emitting device 12 (see FIG. 3), a cord 13 and a strap 14.

Referring to FIG. 1, the main body 10 is formed in a shape resembling an electric guitar and has a size nearly the same as that of the electric guitar. The main body 10 has a body 10A, a rod-like neck 10B which protrudes from one end of the body 10A and which, in the case of an electric guitar, stretches plural strings therealong, and a head 10C provided at an end of the neck 10B. The body 10A has a recessed portion 102 (see FIG. 3) on the side of the front surface, covered with an opaque cover plate 101. Further, the body 10A is provided with a protuberance 100 of a small width protruding from the surface of the cover plate 101 at the position extending from the neck 10B where, in the case of the electric guitar, a pickup is provided. The protuberance 100 has the role of an indication device for indicating the operation position to the player and, further, has the role of giving the operation feeling to the player with the touch of fingers on it in playing operation (plucking operation).

Figure 2:
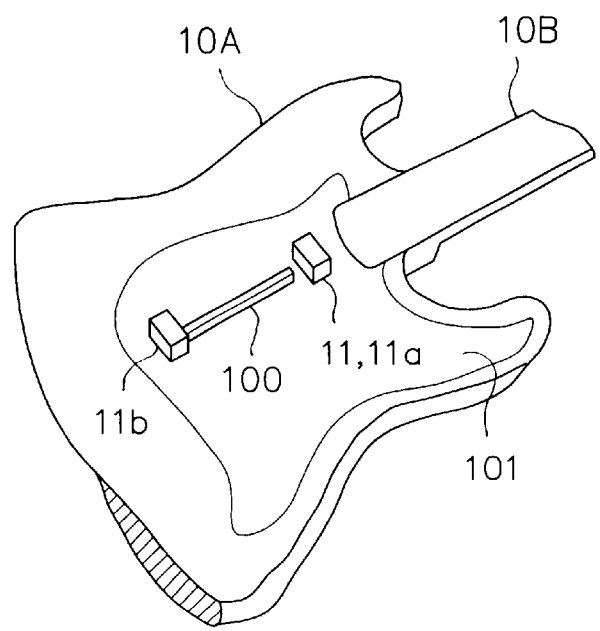
FIG. 2 is a perspective view illustrating a major portion of the electronic guitar.

Referring to FIG. 2, the protuberance 100 is headed in the direction in which the strings are stretched in the case of the electric guitar, and the upper end of the protuberance 100 is located at the positions of strings of the electric guitar, and, as shown in FIG. 4(a), an upper portion of the protuberance 100 is formed in an arcuate shape (inverse U-shape in cross section). Therefore, the protuberance 100 has a shape resembling the string of the electric guitar. Further, the protuberance 100 is formed by fitting a transparent material into the cover plate 101, permitting light from the light-emitting device 12 in the recessed portion 102 to be transmitted to the outer side.

Figure 5:
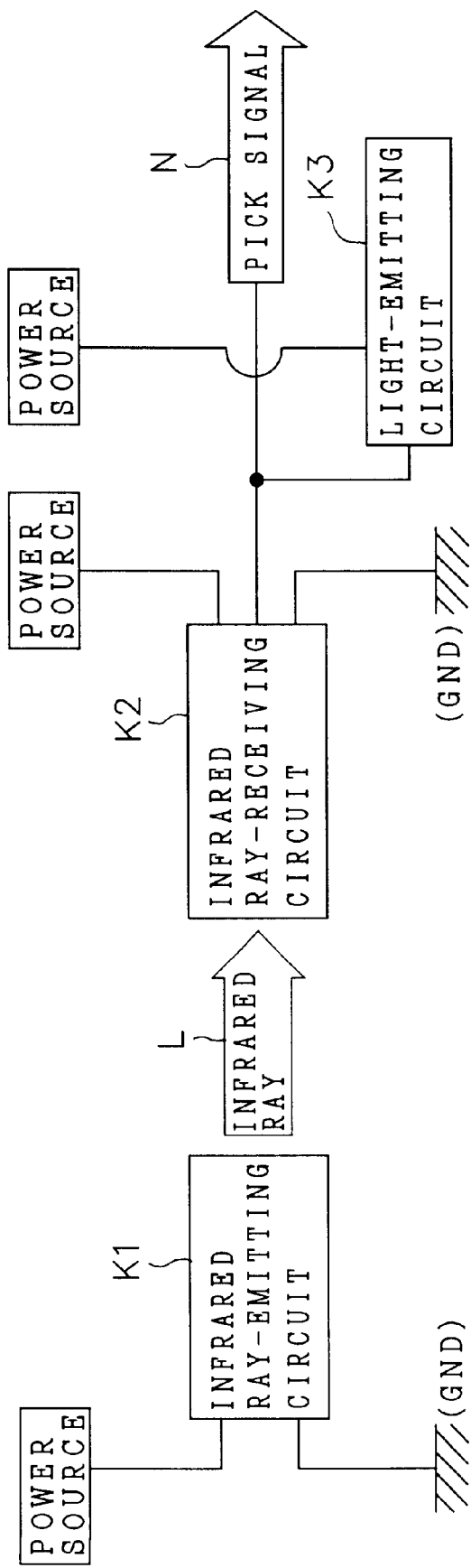
FIG. 5 is a block diagram illustrating a circuit constitution of the electronic guitar.

The photo interrupter 11 serves as an operation unit with which the player plays, i.e., performs the operation of the musical instrument, and detects the player's behavior of operating the musical instrument and works to transmit a pick signal N (see FIG. 5) to the side of the sound source that is not shown. The photo interrupter 11 has a light-emitting unit 11a for emitting an infrared ray L and a light-receiving unit 11b for receiving the infrared ray L from the light-emitting unit 11a. When the infrared ray L emitted from the light-emitting unit 11a is interrupted by a finger and does not reach the light-receiving unit 11b, the light-receiving unit 11b generates a pick signal N. Here, as shown in FIG. 5, the photo interrupter 11 is of the optical synchronous detection type in which the light-emitting unit 11a is provided with an infrared ray-emitting circuit K1 having an infrared ray-emitting diode, and the light-receiving unit 11b is provided with an infrared ray-receiving circuit K2 having a modulation-type photo IC.

Referring to FIGS. 2 and 3, the light-emitting unit 11a and the light-receiving unit 11b of the photo interrupter 11 are arranged, for example, at both sides of the protuberance 100 of the body 10A, so that a path of the infrared ray L emitted from the light-emitting unit 11a passes right over the protuberance 100 close to the position where the string is arranged in the case of the electric guitar.

The light-emitting device 12 illuminates the protuberance 100 of the body 10A from the inside of the body 10A to clearly indicate the position of the indication device (protuberance 100) to the player. When a pick signal N is emitted from the photo interrupter 11, the light-emitting device 12 works to darken the protuberance 100 to let the player know it. The light-emitting device 12 includes a light-emitting circuit K3 (see FIG. 5) having plural LEDs 12a which normally emit light, and causes the LEDs 12a not to emit light when the pick signal N is produced from the photo interrupter 11. The light-emitting device 12 is installed in the recessed portion 102 of the body 10A as shown in FIG. 3, and is positioned right under the protuberance 100 so that the LEDs 12a are arranged along the protuberance 100.

The cord 13 supplies electric power to the photo interrupter 11 and to the light-emitting device 12, and transmits the pick signal N from the photo interrupter 11 to the side of the sound source. The cord 13 is drawn to the outer side from the lower portion on the front surface side of the body 10A like that of the electric guitar. The strap 14 is for hanging the electronic guitar 1 from the body of the player, and is connected at both ends to pins M provided at an upper part of the body 10A and at an upper part of the neck 10B.

Figure 6:
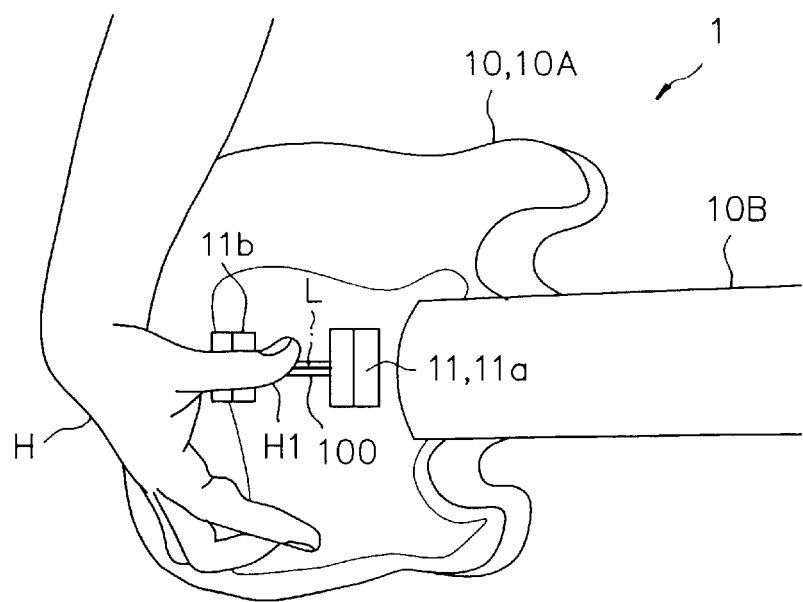
FIG. 6 is a perspective view illustrating a state of playing the electronic guitar with a finger.

To play the electronic guitar 1, the player puts the body 10A of the main body 10 at the position of his waist by utilizing the strap 14 in a manner similar to the electric guitar, then, as shown in FIG. 6, performs such the plucking operation as plucking the protuberance 100 of the body 10A by using, for example, the thumb H1 of the right hand H.

Figure 7:
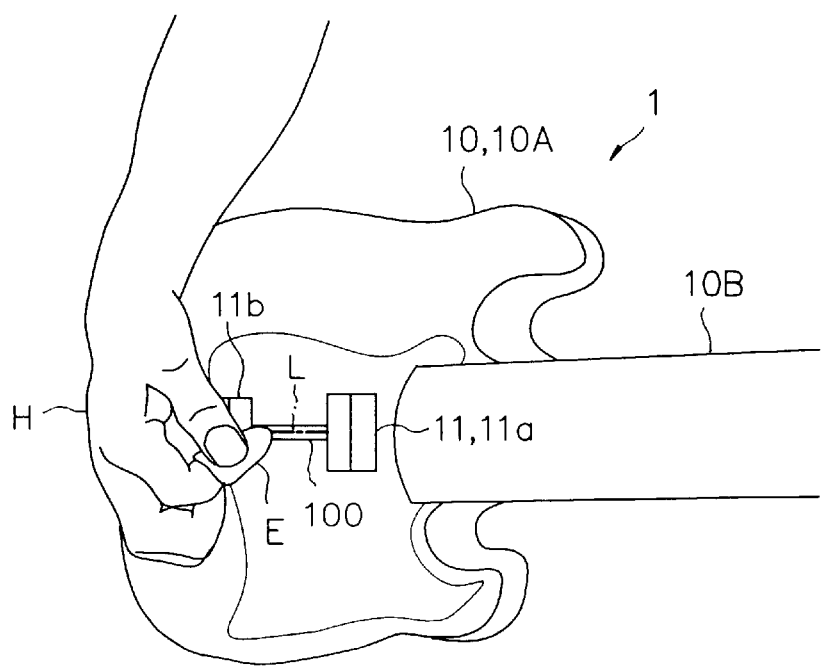
FIG. 7 is a perspective view illustrating a state of playing the electronic guitar with a pick.

When the thumb H1 in the plucking operation interrupts the infrared ray L of the photo interrupter 11, the pick signal N is produced from the photo interrupter 11 and a predetermined guitar sound (sound of a musical instrument) is produced from a speaker that is not shown through the sound source. At the same time, the protuberance 100 of the body 10A that had been shone brightly by light from the light-emitting device 12 becomes dark as no light is emitted from the LEDs 12a to let the player recognize the state where he is playing the electronic guitar 1. When the thumb H1 leaves from the infrared ray L of the photo interrupter 11, the pick signal N is no longer produced, and the LEDs 12a of the light-emitting device 12 emits light to brightly illuminate the protuberance 100 of the body 10A again. The plucking operation may be executed not only by using a finger but also by using a tool such as a pick E shown in FIG. 7.

With this electric guitar 1 as described above, the operation unit operated by the player is formed of a photo interrupter 11 that emits an infrared ray L from the light-emitting unit 11a to the light-receiving unit 11b, and the pick signal N is sent to the side of the sound source when no infrared ray L is detected by the light-receiving unit to produce the sound. Unlike the conventional operation unit using strings, therefore, the detection signals need not be converted from the analog signals into the digital signals, and the time lag in the playing operation by the player can be decreased, i.e., the time lag from when the musical instrument is operated until when the sound is produced can be decreased, so that the player will not feel it unnatural to play. The operation of the musical instrument is detected by only the photo interrupter 11 having the light-emitting unit 11a and the light-receiving unit 1b without using any converter. Therefore, the detection mechanism is simply constituted and is less likely to become faulty and can, further, be easily adjusted.

The photo interrupter 11 using the infrared ray L is easily available at a low cost, and makes it possible to suppress the cost of the electronic guitar 1.

In this electronic guitar 1, further, the main body 10 is shaped like the electric guitar, and the path of infrared ray L of the photo interrupter 11 is provided near the position where the strings of the electric guitar are arranged. Therefore, the player operates the electronic guitar 1 in a manner as if he operates the electric guitar, and does not feel it unnatural to play the electronic musical instrument.

In this electronic guitar 1, further, the indication device (protuberance 100) suggestive of the strings of the electric guitar is provided at a position along the path of infrared ray L of the photo interrupter 11. Therefore, the player easily understands the position of operation (position of the infrared ray L) and finds it easy to handle the musical instrument. In this case, the finger or the pick E that has performed the playing operation comes in touch with the protuberance 100. Therefore, the player feels as if he has touched the string and can get a feeling of satisfaction of having operated the musical instrument.

With this electronic guitar 1, further, the light-emitting device 12 is provided in the body 10A, and the protuberance 100 formed of a transparent material is illuminated by the LEDs 12a of the light-emitting device 12 and brightly shines due to the transmitted light. Therefore, the player more clearly recognizes the position of operation. Additionally, when the pick signal N is produced due to the playing operation by the player, the LEDs 12a are caused not to emit light and, hence, the protuberance 100 is darkened letting the player recognize to a sufficient degree that he surely is playing the musical instrument.

Referring to FIG. 4(b); further, the same effect as that of the protuberance 100 can be obtained even when the body 10A is provided with a dent 103 formed of a transparent member as the indication device. Further, the protuberance 100 or the dent 103 may be formed together with the transparent cover plate 101 as a unitary structure, and the portions other than the protuberance 100 or the dent 103 of the cover plate 101 may be colored to be opaque.

Further, the LEDs 12a of the light-emitting device 12 may be those that emit light of two colors such as red and blue, so that the color of the protuberance 100 can be varied depending upon whether the pick signal N is generated or not.

As indicated by a broken line in FIG. 1, further, a vibration-generating device 15 may be provided in the body 10A near a position that comes in touch with the body of the player. When the pick signal N is generated, for example, the vibration-generating device is actuated so that the player may feel that he is playing well.

It is further possible to provide plural operation buttons on the side of the neck 10B of the main body 10, so that when the photo interrupter 11 is operated in a state where the operation buttons are depressed, the key of the produced sound changes for every button that is operated.

It is further possible to provide plural photo interrupters 11 to emit plural infrared rays L from the operation unit, in order to change the key or the tone color for every infrared ray L that is emitted. In this case, the protuberances 100 which are the indication device may be provided for every infrared ray L and may be illuminated by the respective light-emitting devices 12.

The electronic musical instrument in which the operation unit is formed of a photo interrupter 11 is not limited to the guitar but may be any other string-plucking musical instrument such as a ukulele, a samisen, a harp or the like.

Next, a musical game device A equipped with the electronic guitar 1 will be described with reference to FIGS. 8 to 10.

Figure 8:
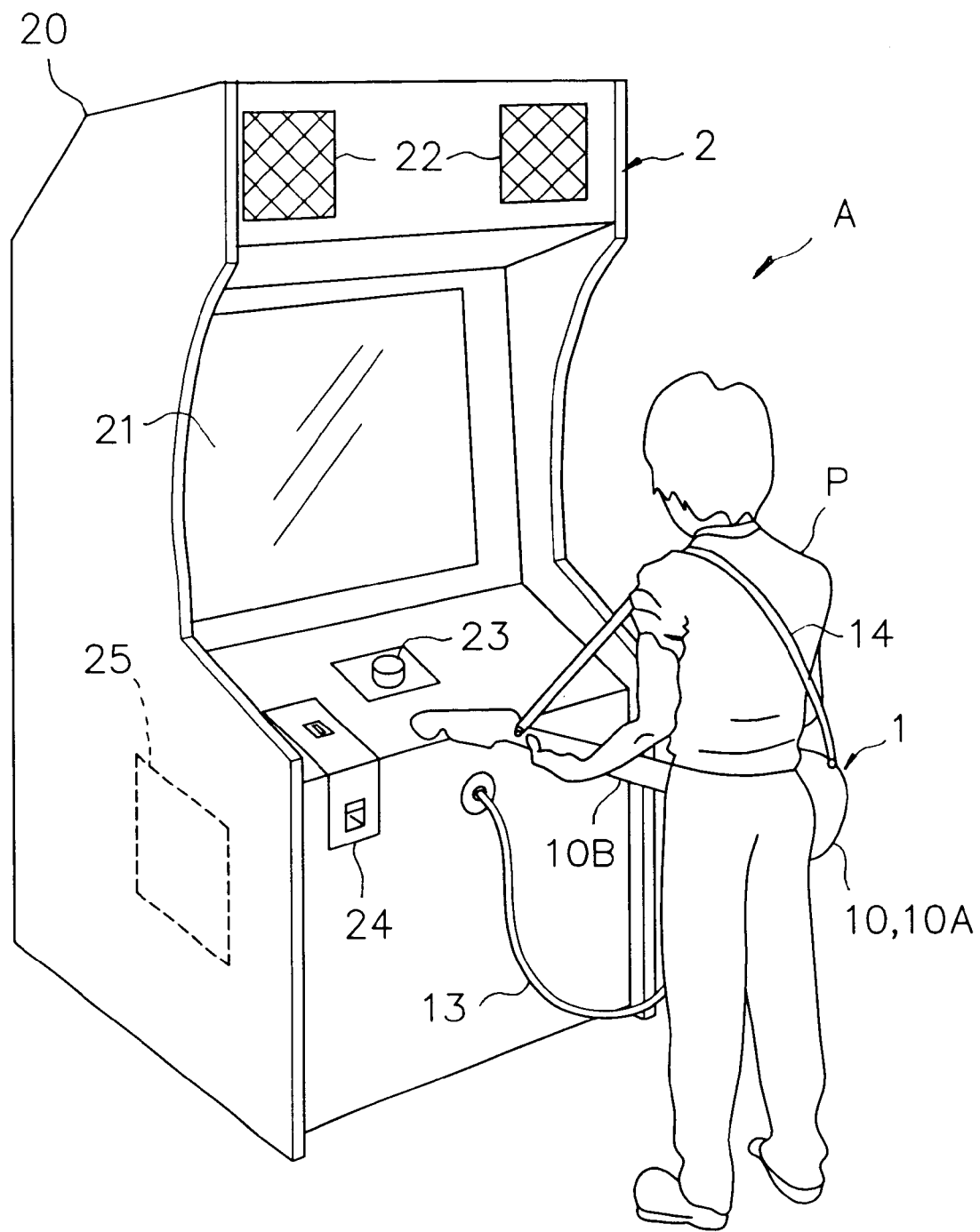
FIG. 8 is a perspective view showing the appearance of a music game device equipped with the electronic guitar shown in FIG. 1.
Figure 9:
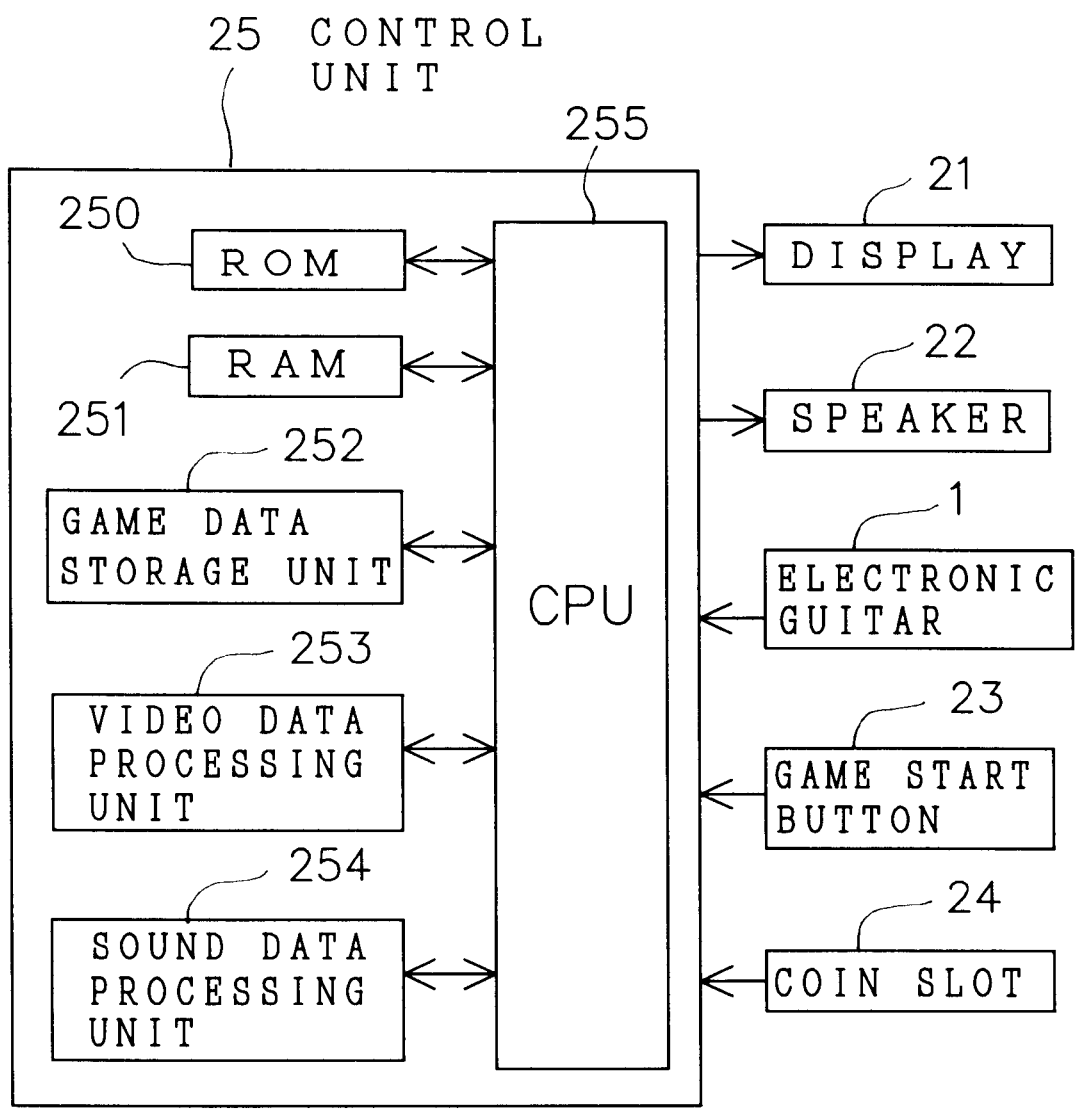
FIG. 9 is a block diagram illustrating the circuit constitution of the music game device and the flow of signals.

Referring to FIG. 8, the musical game device A is constituted by the electronic guitar 1 and a game device body 2. A player P operates the electronic guitar 1 according to an instruction from the game device body 2, and the sound of play of the guitar is produced accompanied by BGM (background music) from the game device body 2.

The game device body 2 is provided with a display 21, speakers 22, a game start button 23, a coin slot 24 and a control unit 25 in a cabinet 20. Referring to FIG. 9, the control unit 25 includes a ROM 250, a RAM 251, a game data storage unit 252, a video data processing unit 253, a sound data processing unit 254 and a CPU 255. In the control unit 25, according to a program of a music game stored in the ROM 250, the CPU 255 sends video data and sound data stored in the game data storage unit 252 to the video data processing unit 253 and to the sound data processing unit 254, so that the game picture is shown on the display 21 and that the BGM sound and the sound of play of the guitar are produced from the speakers 22. The sound data processing unit 254 includes a sound source of the electronic guitar 1.

Figure 10:
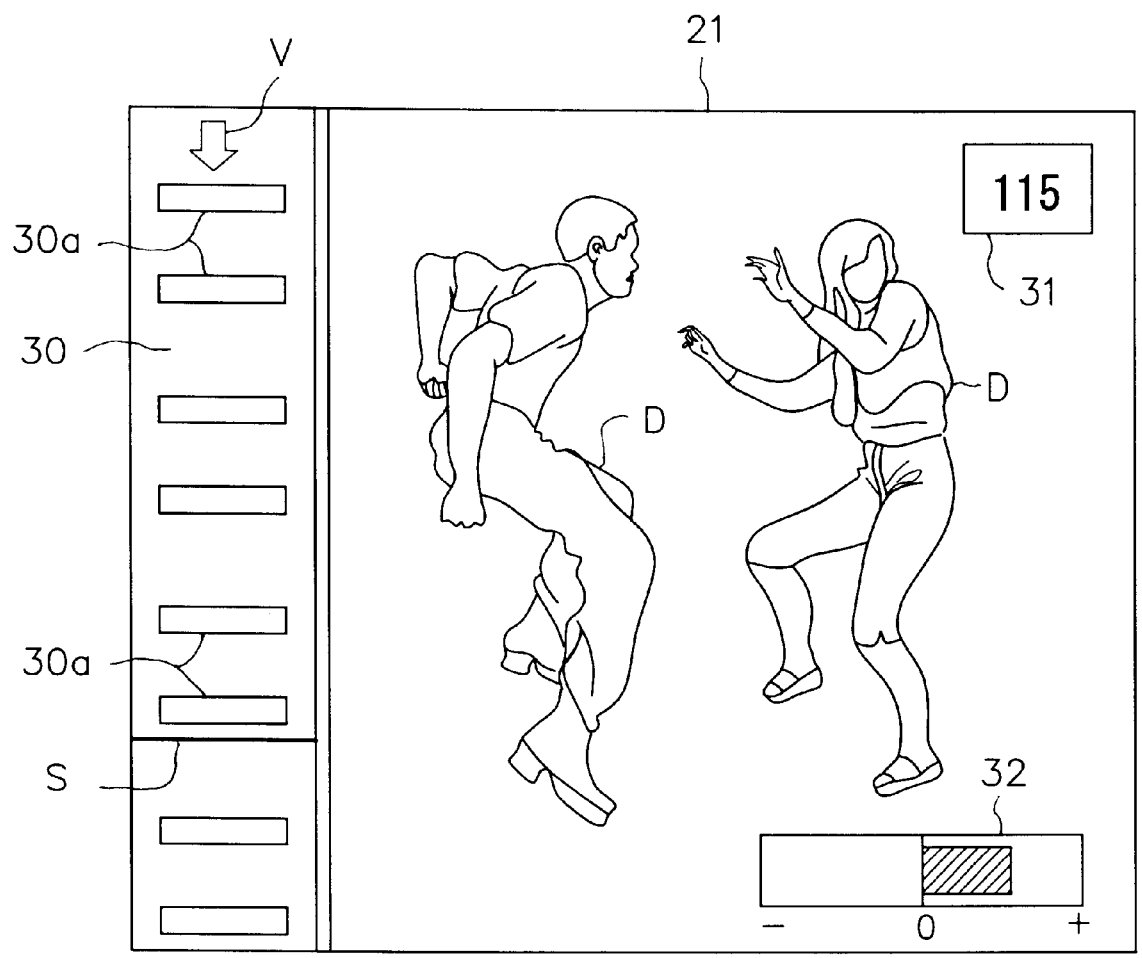
FIG. 10 is a view illustrating the constitution of a game picture that is displayed.

Referring to FIG. 10, the video data in the game data storage unit 252 include data for game music 30 for indicating to the player P a timing for operating the electronic guitar 1, data related to dancers D dancing accompanied by the BGM, and data indicating a score indicator portion 31 and an evaluation indicator portion 32. Further, the sound data in the game data storage unit 252 include BGM data to give rhythm for operating the electronic guitar 1 in accordance with the game musical score 30, and guitar play data produced when the electronic guitar 1 is operated according to the game musical score 30.

Here, as shown in FIG. 10, the game musical score 30 consists of plural rhythm bars 30a arranged at predetermined intervals to indicate the timings to the player P for operating the electronic guitar 1. By moving (lowering) the game musical score 30 on the picture on the display 21 at a predetermined speed V accompanying the BGM, the rhythm bar 30a passes over a reference operation line S in match with rhythms of the BGM. Accordingly, as the player P operates the electronic guitar 1 at a moment when the rhythm bar 30a overlaps the operation line S, a predetermined piece is played by the guitar based upon the guitar play data in match with the rhythm of the BGM.

When the electronic guitar 1 is operated in match with the timing at which the rhythm bar 30a overlaps the operation line S, a specified score is added to the score indicator portion 31 and the technical evaluation corresponding to the score is shown as a bar graph on the plus side on the evaluation indicator portion 32. When the electronic guitar 1 is operated at a timing at which the rhythm bar 30a does not overlap the operation line S, the sound that is out of tune with the piece to be played by the guitar is produced out of rhythm of the BGM, and the technical evaluation of a minus point is indicated as a bar graph on the minus side on the evaluation indicator portion 32.

By using the electronic guitar 1 for the music game device A as described above, the player can enjoy playing a variety of tunes by using the electronic guitar 1 even though there is provided only one photo interrupter 11 and only one infrared ray L is emitted from the operation unit.

Industrial Applicability

According to the first and third inventions, no large time lag occurs from when the musical instrument is operated until when the sound is produced, and the player can enjoy playing the electronic musical instrument in a natural form. In these inventions, further, the detection mechanism does not become complex, the musical instrument rarely becomes faulty and can be easily adjusted.

According to the second invention, the player can operate the musical instrument (playing operation) in the same manner as he plucks the strings of the string-plucking musical instrument, and feels it little unnatural to operate the electronic musical instrument.

According to the fourth invention, the player is allowed to easily play the musical instrument by utilizing the indication device as a mark.

According to the fifth and sixth inventions, the light-emitting device can clearly show the player the position of the indication device and can also clearly show whether he properly operates the musical instrument or not.

According to the seventh invention, the player feels as if he is touching the strings and finds it less unnatural to play the musical instrument.

According to the eighth invention, the player can feel with his body whether he is playing the musical instrument well due to the action of the vibration-generation device.

What is claimed is:

1. An electronic musical instrument comprising:

a main body formed in a shape resembling a string-plucking musical instrument, a photo sensor provided at the main body to be operated by a player and having a light-emitting unit and a light-receiving unit for receiving light emitted from the light-emitting unit, said photo sensor generating a signal for producing a sound when the light emitted from the light-emitting unit toward the light-receiving unit is not detected by the light-receiving unit, an indication device provided at the main body and being located along a path of the light of the photo sensor to allow the player to notice a position of operation, and a light-emitting device provided at the main body and electrically connected to the light-receiving unit to indicate whether or not the light-receiving unit detects the light from the light-emitting unit by emitting or not emitting light.

2. An electronic musical instrument according to claim 1, wherein said indicating device is formed of a light-transmitting material to pass through the light from the light-emitting device.

3. An electronic musical instrument according to claim 1, wherein said indication device is formed of a touch-sensing protuberance or dent to provide an operation feeling to the player.

4. An electronic musical instrument according to claim 1, wherein a plurality of sets of the photo sensors and indication devices, each set being formed of one photo sensor and one indication device, is formed on the main body, said light-emitting device indicating whether or not the light-receiving unit in each set detects the light from the light-emitting unit.

5. An electronic musical instrument comprising:

a main body formed in a shape resembling a string-plucking musical instrument, a photo sensor provided at the main body to be operated by a player and having a light-emitting unit and a light-receiving unit for receiving light emitted from the light-emitting unit, said photo sensor generating a signal for producing a sound when the light emitted from the light-emitting unit toward the light receiving unit is not detected by the light-receiving unit, an indication device provided at the main body and being located along a path of the light of the photo sensor to allow the player to notice a position of operation, and a light-emitting device provided at the main body and electrically connected to the light-receiving unit to provide at least two colors, said light-emitting device indicating whether or not the light-receiving unit detects the light from the light-emitting unit by changing the color of emitting light.

6. An electronic musical instrument according to claim 5, wherein said indicating device is formed of a light-transmitting material to pass through the light from the light-emitting device.

7. An electronic musical instrument according to claim 5, wherein said indication device is formed of a touch-sensing protuberance or dent to provide an operation feeling to the player.

8. An electronic musical instrument comprising:

a main body formed in a shape resembling a string-plucking musical instrument, a photo sensor provided in the main body to be operated by a player and having a light-emitting unit and a light-receiving unit for receiving light emitted from the light-emitting unit, said photo sensor generating a signal for producing a sound when the light emitted from the light-emitting unit toward the light receiving unit is not detected by the light-receiving unit, an indication device provided at the main body and formed along a path of the light of the photo sensor to indicate a position of operation to the player, and a vibration-generation device provided on the main body at a position where the player touches, said vibration-generation device being electrically connected to the light-receiving unit to indicate whether or not the light-receiving unit detects light.

9. An electronic musical instrument according to claim 8, wherein said indication device is formed of a touch-sensing protuberance or dent to provide an operation feeling to the player.

\* \* \* \* \*